United States Patent
Ohm et al.

(10) Patent No.: US 11,780,995 B2
(45) Date of Patent: *Oct. 10, 2023

(54) POLYMER COMPOSITION FOR PRODUCING GEL EXTRUDED ARTICLES AND POLYMER ARTICLES MADE THEREFROM

(71) Applicant: Celanese Sales Germany GmbH, Taunus (DE)

(72) Inventors: Christian Ohm, Gernsheim (DE); Rainer Walkenhorst, Melle (DE); Patrick Scheibe, Frankfurt am Main (DE)

(73) Assignee: Celanese Sales Germany GmbH, Taunus (DE)

( * ) Notice: Subject to any disclaimer, the term of this patent is extended or adjusted under 35 U.S.C. 154(b) by 215 days.

This patent is subject to a terminal disclaimer.

(21) Appl. No.: 17/129,266

(22) Filed: Dec. 21, 2020

(65) Prior Publication Data

US 2021/0108056 A1    Apr. 15, 2021

Related U.S. Application Data

(63) Continuation of application No. 16/104,430, filed on Aug. 17, 2018, now Pat. No. 10,875,991.

(60) Provisional application No. 62/546,857, filed on Aug. 17, 2017.

(51) Int. Cl.
| | | |
|---|---|---|
| *C08L 23/06* | (2006.01) | |
| *C08L 23/08* | (2006.01) | |
| *C08L 91/00* | (2006.01) | |
| *C08J 3/075* | (2006.01) | |
| *C08J 5/18* | (2006.01) | |

(52) U.S. Cl.
CPC ............. *C08L 23/06* (2013.01); *C08J 3/075* (2013.01); *C08J 5/18* (2013.01); *C08L 23/0815* (2013.01); *C08L 91/00* (2013.01); *C08J 2323/06* (2013.01); *C08J 2491/00* (2013.01); *C08L 2203/12* (2013.01); *C08L 2203/16* (2013.01); *C08L 2205/14* (2013.01); *C08L 2207/062* (2013.01)

(58) Field of Classification Search
CPC ...... C08L 23/06; C08L 23/0815; C08L 91/00; C08L 2205/14; C08L 2207/062; C08L 2203/12; C08L 2203/16; C08J 3/075; C08J 5/18; C08J 2491/00; C08J 2323/06
USPC .......................................................... 524/62
See application file for complete search history.

(56) References Cited

U.S. PATENT DOCUMENTS

| | | | |
|---|---|---|---|
| 5,643,511 A | 7/1997 | Pluyter et al. | |
| 6,743,388 B2 | 6/2004 | Sridharan et al. | |
| 7,867,614 B2 | 1/2011 | Seeling et al. | |
| 8,993,704 B2 * | 3/2015 | Robert | C08F 10/02 526/172 |
| 2014/0212612 A1 * | 7/2014 | Sbriglia | C08F 210/02 521/143 |
| 2015/0284484 A1 | 10/2015 | Zhou et al. | |

FOREIGN PATENT DOCUMENTS

| | | | | |
|---|---|---|---|---|
| CN | 103319964 A | | 9/2013 | |
| CN | 103946246 A | | 7/2014 | |
| CN | 104045901 A | | 9/2014 | |
| CN | 104098727 A | | 10/2014 | |
| CN | 105419057 A | | 3/2016 | |
| CN | 106317562 A | * | 1/2017 | ............... B29D 7/01 |
| CN | 106317562 A | | 1/2017 | |
| CN | 106319667 A | | 1/2017 | |
| CN | 106905580 | | 6/2017 | |
| DE | 3118499 A1 | | 3/1982 | |
| EP | 2610269 A1 | | 7/2013 | |
| EP | 3060586 A1 | | 8/2016 | |
| EP | 3060587 A1 | | 8/2016 | |
| GB | 2051667 A | | 1/1981 | |
| GB | 2077272 | | 12/1981 | |
| GB | 2077272 A | * | 12/1981 | ............... B29B 9/16 |
| JP | 2010235962 A | | 10/2010 | |
| JP | 2015081335 A | | 4/2015 | |
| JP | 2015193816 A | | 11/2015 | |
| JP | 2015193963 A | | 11/2015 | |

OTHER PUBLICATIONS

MIPELON PM-200, Technical Data Sheet, Nov. 2011. (Year: 2011).*
Translation of CN 106317562, Jan. 11, 2017. (Year: 2017).*
CN Office Action dated Apr. 16, 2021 Corresponding to Application No. CN201610694953.
PCT/IB2018/056233 International Search Report and Written Opinion dated Dec. 5, 2018, 5 pages.
EP Office Action Corresponding to Application No. 18779757.6 dated Mar. 31, 2023.

* cited by examiner

*Primary Examiner* — Hui H Chin
(74) *Attorney, Agent, or Firm* — Dority & Manning, P.A.

(57) ABSTRACT

A polymer composition for producing gel extruded articles is described. The polymer composition contains polyethylene particles combined with a plasticizer. The polyethylene particles are particularly selected so that the particles rapidly form a homogeneous gel-like material when combined with the plasticizer during gel processing. In one embodiment, the polyethylene used to produce the particles has a relatively low bulk density. Alternatively or in addition, the particles can have a carefully controlled particle size distribution. Polymer articles such as fibers and films can be produced having little to no imperfections.

16 Claims, 1 Drawing Sheet

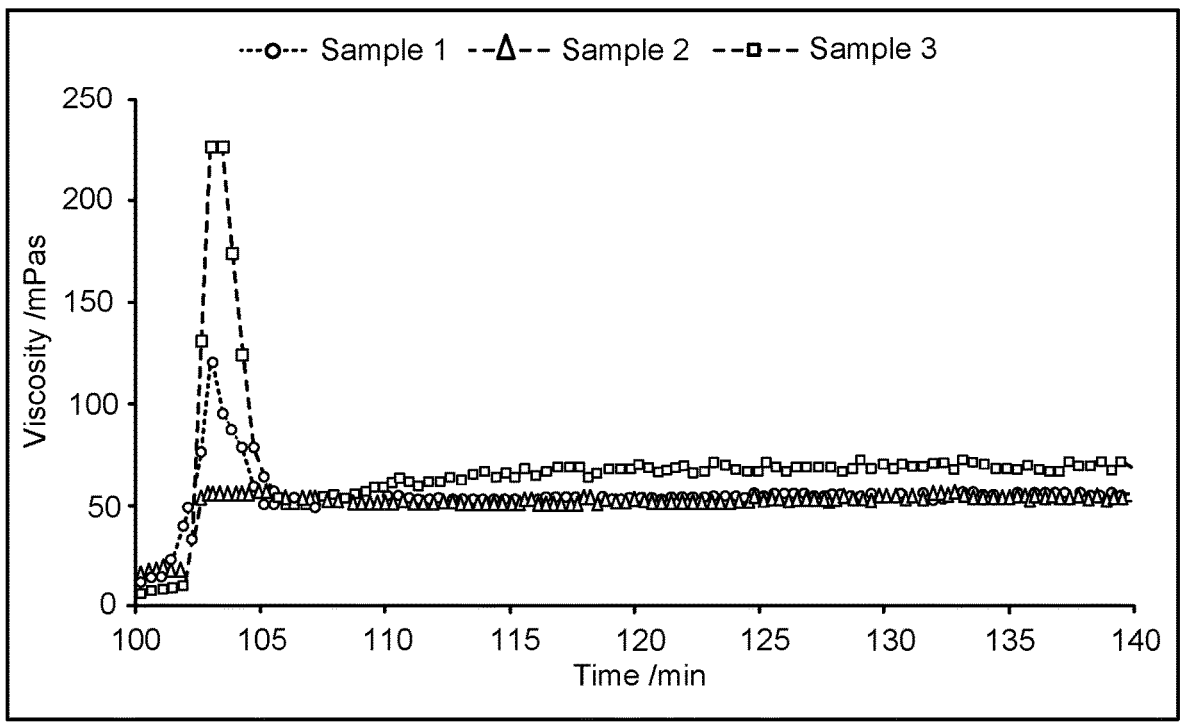

POLYMER COMPOSITION FOR PRODUCING GEL EXTRUDED ARTICLES AND POLYMER ARTICLES MADE THEREFROM

RELATED APPLICATIONS

The present application is a continuation application and claims priority to U.S. patent application Ser. No. 16/104,430, having a filing date of Aug. 17, 2018 and which is based on and claims priority to U.S. Provisional Application Ser. No. 62/546,857, having a filing date of Aug. 17, 2017, both of which are incorporated herein by reference in their entirety.

BACKGROUND

Polyethylene polymers have numerous and diverse uses and applications. For example, high density polyethylenes are valuable engineering plastics, with a unique combination of abrasion resistance, surface lubricity, chemical resistance and impact strength. They find application in the production of high strength fibers for use in ropes and anti-ballistic shaped articles and in the production of other elongated articles, such as membranes for lithium batteries. However, since the flowability of these materials in the molten state decreases as the molecular weight increases, processing by conventional techniques, such as melt extrusion, is not always possible.

One alternative method for producing fibers and other elongated components from polyethylene polymers is by gel-processing in which the polymer is combined with a solvent. The resultant gel is extruded into a fiber or membrane, and may be stretched in one or two directions. Also, part or all of the solvent may be removed from the product.

In the past, however, problems have been experienced in gel-processing polyethylene polymers. For example, during gel extrusion of polyethylene polymers, the appearance of gel specks can compromise the physical properties of the resulting product. Gel specks generally refer to polyethylene polymers that have not fully dissolved or otherwise intimately combined with the solvent during the extrusion process. When forming membranes, for instance, these gel specks can render the product unusable for some applications, such as battery separator applications. In the past, in order to remove gel specks, gel processing was done with lower molecular weight polymers which can reduce the strength of the resulting product. Alternatively, processing times can be increased in order to hopefully eliminate gel specks prior to extrusion. Increasing processing time, however, lowers throughput and increases the cost of the process.

In view of the above, a need exists for an improved polyethylene composition capable of being gel spun or gel extruded at relatively fast speeds without the formation of gel specks or other impurities. A need also exists for an improved process for producing extruded articles from polyethylene polymers using gel-processing.

SUMMARY

In general, the present disclosure is directed to polyethylene compositions well suited for gel processing applications. The polyethylene compositions, for instance, can be used to produce elongated articles, such as films, membranes, fibers, and the like. In accordance with the present disclosure, a polyethylene, such as a high density polyethylene resin, is combined with a plasticizer to form a gel-like material. In accordance with the present disclosure, the polyethylene resin is particularly selected so as to have a carefully controlled bulk density and/or a carefully controlled particle size distribution. The polyethylene resin characteristics have been found to dramatically improve the rapid formation of a gel-like material without any remaining gel specks or impurities that can lead to product imperfections when the composition is extruded.

For example, in one embodiment, the present disclosure is directed to a polymer composition for producing gel extruded articles. The polymer composition comprises a plasticizer blended with polyethylene resin. The polyethylene resin can be made from a high density polyethylene, such as a high molecular weight polyethylene. In one embodiment, for instance, the resin is made from an ultra-high molecular weight polyethylene. The polyethylene resin is combined with the plasticizer in order to produce a gel-like composition capable of being extruded. In accordance with the present disclosure, the polyethylene resin has at least one of the following characteristics:

(1) A bulk density of less than about 0.35 g/cm$^3$; and/or
(2) A median particle size (d50) of less than 125 microns and wherein 90% of the particles have a particle size of less than about 180 microns.

In one embodiment, the polyethylene resin particles include both of the above characteristics. Polyethylene particles as described above have been found to dramatically improve gel processing of the polyethylene polymer. For instance, the polyethylene particles having at least one of the above characteristics have been found to rapidly combine with the plasticizer to produce a homogeneous gel-like material. Thus, the above composition can be placed into an extruder to produce a gel-like composition in a very short amount of time and without the formation of gel specks or other small particles not dissolved or otherwise homogeneously blended with the plasticizer.

As described above, in one embodiment, the high density polyethylene particles can have a relatively low bulk density for improved blending with the plasticizer. The bulk density, for instance, in one embodiment, can be less than about 0.3 g/cm$^3$, such as less than about 0.28 g/cm$^3$, such as less than about 0.26 g/cm$^3$. The bulk density is generally greater than about 0.15 g/cm$^3$.

Alternatively or in addition to having a low bulk density, the polyethylene particles can also have a relatively small median size (d50). For instance, the polyethylene particles can have a median particle size (d50) of from about 60 microns to less than 125 microns, such as from about 70 microns to about 110 microns. In addition, 90% of the high density polyethylene particles can have a particle size of less than about 170 microns, such as less than about 165 microns, such as less than about 160 microns, such as less than about 155 microns, such as less than about 150 microns, such as less than about 145 microns, such as less than about 140 microns.

The high density polyethylene particles of the present disclosure have been found to rapidly combine with the plasticizer under heat to form a homogeneous gel-like material. For example, when tested according to a solubility test as will be described in greater detail below, the high density polyethylene particles can have a solubility of less than about 3 minutes, such as less than about 2.5 minutes, such as less than about 2 minutes.

In general, the polymer composition contains the high density polyethylene resin in an amount up to about 50% by weight. The plasticizer, for instance, can be present in the composition in an amount greater than about 50% by weight, such as in an amount greater than about 60% by weight, such as in an amount greater than about 70% by weight, such as in an amount greater than about 80% by weight, such as in an amount greater than about 90% by weight. Various different materials can be used as the plasticizer. For instance, the plasticizer may comprise a mineral oil, a paraffinic oil, a hydrocarbon oil, an alcohol, or the like. For instance, the plasticizer may comprise decaline, xylene, dioctyl phthalate, dibutyl phthalate, stearyl alcohol, oleyl alcohol, decyl alcohol, nonyl alcohol, diphenyl ether, n-decane, n-dodecane, or mixtures thereof. In one embodiment, the plasticizer may comprise a C5-C12 hydrocarbon, such as a C5-C12 saturated hydrocarbon. For example, the plasticizer may comprise heptane, hexane, or the like.

In one embodiment, the polyethylene used to produce the particles can have a relatively high molecular weight. In fact, one of the advantages of the present disclosure is the ability to rapidly blend relatively high molecular weight polyethylene particles with a plasticizer without forming gel specks. In one embodiment, the use of higher molecular weight polyethylene particles may be beneficial, especially in applications where greater strength properties are needed or desired. For example, the polyethylene used to produce the particles can have a molecular weight of greater than about 500,000 g/mol, such as greater than about 1,000,000 g/mol, such as greater than about 1,500,000 g/mol, such as greater than about 2,000,000 g/mol, such as greater than about 2,500,000 g/mol, such as greater than about 3,000,000 g/mol, such as greater than about 3,500,000 g/mol, such as even greater than about 4,000,000 g/mol. In one embodiment, the polyethylene used to produce the particles comprises a Ziegler-Natta catalyzed ultrahigh molecular weight polyethylene.

The present disclosure is also directed to polymer articles formed from the above polymer composition. The polymer articles can be produced through a gel extrusion or gel-spinning process. Polymer articles made in accordance with the present disclosure include fibers, films, membranes, or the like.

The present disclosure is also directed to a process for producing polymer articles. The process includes the steps of forming a gel-like composition from the polymer composition described above. The gel-like composition is then extruded through a die to form a polymer article. The polymer article, for instance, may comprise fibers, a film, or a membrane. During formation of the polymer article, at least part of the plasticizer is separated and removed from the polyethylene particle. For instance, in one embodiment, greater than 80%, such as greater than 90%, such as greater than 95%, such as greater than 98% of the plasticizer is removed during formation of the polymer article.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which:

FIG. 1 is a graphical representation of some of the results obtained in Example No. 1 below.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polymer composition well suited for producing gel extruded articles, such as fibers, films and membranes. The polymer composition contains a polyethylene resin, such as high density polyethylene particles, combined with a plasticizer. In accordance with the present disclosure, the polyethylene particles are particularly constructed so that the particles rapidly form a homogeneous gel-like material when combined with the plasticizer and heated.

In the past, various problems have been experienced in gel processing polyethylene polymers. For instance, various polyethylene polymers can require significant amounts of time in order to dissolve into a processing solvent during extrusion. If the residence time in the extruder is not long enough to allow complete dissolution of the polymer resin, the formation of defects can result in the polymer article being formed. The defects, which can occur due to the presence of gel specks, can lead to difficulties in production of the articles or reduced product quality. Ultimately, longer dissolution times or incomplete dissolution can limit product capability. In addition, these problems can result in lower capacity of a gel-processing production line.

The present disclosure, however, is directed to selecting a particular polyethylene resin that is better suited for quickly blending with a plasticizer to form a homogeneous gel-like material. In particular, it is believed that the polyethylene particles of the present disclosure provide higher interaction area between the plasticizer and the polymer, lowering solubility times thereby eliminating gel specks and preventing defects from occurring in the extruded polymer articles. In one embodiment, the process of the present disclosure allows for the use of relatively high molecular weight polymers that can result in polymer articles with improved physical properties, such as strength characteristics.

In accordance with the present disclosure, the polyethylene resin selected for combination with the plasticizer can have at least one of two physical characteristics. In one embodiment, for instance, the resin is made from a polyethylene polymer having a relatively low bulk density. The lower bulk density has been found to unexpectedly and dramatically shorten the time needed for the polymer to dissolve in the plasticizer or otherwise form a homogeneous gel-like material. In an alternative embodiment or in addition to having a relatively low bulk density, the polyethylene resin particles can have a unique particle size distribution that has also been found to dramatically improve dissolution times.

According to the present disclosure, the polymer composition contains a polyethylene polymer. As used herein, a polyethylene polymer refers to a polymer made from over 90% ethylene derived units, such as greater than 95% ethylene derived units, or 100% ethylene derived units. The polyethylene can be a homopolymer or a copolymer, including a terpolymer, having other monomeric units. In one embodiment, the polyethylene particles are made from a high density polyethylene. A high density polyethylene has a density of about 0.93 g/cm$^3$ or greater. The polyethylene used to produce the particles can comprise a high molecular weight polyethylene, a very high molecular weight polyethylene, and/or an ultrahigh molecular weight polyethylene. "High molecular weight polyethylene" refers to polyethylene compositions with weight-average molecular weight of at least about $3 \times 10^5$ g/mol and, as used herein, is intended to include very-high molecular weight polyethylene and ultra-high molecular weight polyethylene. For purposes of the present specification, the molecular weights referenced herein are determined in accordance with the Margolies equation ("Margolies molecular weight").

"Very-high molecular weight polyethylene" refers to polyethylene compositions with a weight average molecular weight of less than about $3 \times 10^6$ g/mol and more than about $1 \times 10^6$ g/mol. In some embodiments, the molecular weight of the very-high molecular weight polyethylene composition is between about $2 \times 10^6$ g/mol and less than about $3 \times 10^6$ g/mol.

"Ultra-high molecular weight polyethylene" refers to polyethylene compositions with weight-average molecular weight of at least about $3 \times 10^6$ g/mol. In some embodiments, the molecular weight of the ultra-high molecular weight polyethylene composition is between about $3 \times 10^6$ g/mol and about $30 \times 10^6$ g/mol, or between about $3 \times 10^6$ g/mol and about $20 \times 10^6$ g/mol, or between about $3 \times 10^6$ g/mol and about $10 \times 10^6$ g/mol, or between about $3 \times 10^6$ g/mol and about $6 \times 10^6$ g/mol.

As described above, in one embodiment, the polyethylene is a homopolymer of ethylene. In another embodiment, the polyethylene may be a copolymer. For instance, the polyethylene may be a copolymer of ethylene and another olefin containing from 3 to 16 carbon atoms, such as from 3 to 10 carbon atoms, such as from 3 to 8 carbon atoms. These other olefins include, but are not limited to, propylene, 1-butene, 1-pentene, 1-hexene, 1-heptene, 1-octene, 4-methylpent-1-ene, 1-decene, 1-dodecene, 1-hexadecene and the like. Also utilizable herein are polyene comonomers such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. However, when present, the amount of the non-ethylene monomer(s) in the copolymer may be less than about 10 mol. %, such as less than about 5 mol. %, such as less than about 2.5 mol. %, such as less than about 1 mol. %, wherein the mol. % is based on the total moles of monomer in the polymer.

In one embodiment, the polyethylene may have a monomodal molecular weight distribution. Alternatively, the polyethylene may exhibit a bimodal molecular weight distribution. For instance, a bimodal distribution generally refers to a polymer having a distinct higher molecular weight and a distinct lower molecular weight (e.g. two distinct peaks) on a size exclusion chromatography or gel permeation chromatography curve. In another embodiment, the polyethylene may exhibit more than two molecular weight distribution peaks such that the polyethylene exhibits a multimodal (e.g., trimodal, tetramodal, etc.) distribution. Alternatively, the polyethylene may exhibit a broad molecular weight distribution wherein the polyethylene is comprised of a blend of higher and lower molecular weight components such that the size exclusion chromatography or gel permeation chromatography curve does not exhibit at least two distinct peaks but instead exhibits one distinct peak broader than the individual component peaks.

In one embodiment, the composition may be comprised of more than one polyethylene, each having a different molecular weight and/or molecular weight distribution. For instance, the molecular weight distribution may be within the average molecular weight specifications provided above.

In addition, the composition may be comprised of a blend of one or more polyethylene polymers or copolymers and another thermoplastic polymer such as a polypropylene, a polybutylene, a polymethylpentene, a linear low density polyethylene, or mixtures thereof. However, the amount of non-polyethylene polymer(s) in the composition may be less than about 10 wt. %, such as less than about 5 wt. %, such as less than about 2.5 wt. %, such as less than about 1 wt. %, wherein the wt % is based on the total weight of the composition.

Any method known in the art can be utilized to synthesize the polyethylene. The polyethylene powder is typically produced by the catalytic polymerization of ethylene monomer or optionally with one or more other 1-olefin co-monomers, the 1-olefin content in the final polymer being less or equal to 10% of the ethylene content, with a heterogeneous catalyst and an organo aluminum or magnesium compound as cocatalyst. The ethylene is usually polymerized in gaseous phase or slurry phase at relatively low temperatures and pressures. The polymerization reaction may be carried out at a temperature of between 50° C. and 100° C. and pressures in the range of 0.02 and 2 MPa.

The molecular weight of the polyethylene can be adjusted by adding hydrogen. Altering the temperature and/or the type and concentration of the co-catalyst may also be used to fine tune the molecular weight. Additionally, the reaction may occur in the presence of antistatic agents to avoid fouling and product contamination.

Suitable catalyst systems include but are not limited to Ziegler-Natta type catalysts. Typically Ziegler-Natta type catalysts are derived by a combination of transition metal compounds of Groups 4 to 8 of the Periodic Table and alkyl or hydride derivatives of metals from Groups 1 to 3 of the Periodic Table. Transition metal derivatives used usually comprise the metal halides or esters or combinations thereof. Exemplary Ziegler-Natta catalysts include those based on the reaction products of organo aluminum or magnesium compounds, such as for example but not limited to aluminum or magnesium alkyls and titanium, vanadium or chromium halides or esters. The heterogeneous catalyst might be either unsupported or supported on porous fine grained materials, such as silica or magnesium chloride. Such support can be added during synthesis of the catalyst or may be obtained as a chemical reaction product of the catalyst synthesis itself.

As will be explained in greater detail below, of particular advantage, the polyethylene particles made in accordance with the present disclosure can quickly blend or dissolve with the plasticizer even when the polyethylene polymer is produced using a Ziegler-Natta catalyst. In the past, for instance, problems have been experienced in rapidly forming homogeneous gel-like materials for gel processing using Ziegler-Natta catalyzed polyethylene polymers, especially high molecular weight polymers.

In one embodiment, a suitable catalyst system could be obtained by the reaction of a titanium(IV) compound with a trialkyl aluminum compound in an inert organic solvent at temperatures in the range of −40° C. to 100° C., preferably −20° C. to 50° C. The concentrations of the starting materials are in the range of 0.1 to 9 mol/L, preferably 0.2 to 5 mol/L, for the titanium(IV) compound and in the range of 0.01 to 1 mol/L, preferably 0.02 to 0.2 mol/L for the trialkyl aluminum compound. The titanium component is added to the aluminum component over a period of 0.1 min to 60 min, preferably 1 min to 30 min, the molar ratio of titanium and aluminum in the final mixture being in the range of 1:0.01 to 1:4.

In another embodiment, a suitable catalyst system is obtained by a one or two-step reaction of a titanium(IV) compound with a trialkyl aluminum compound in an inert organic solvent at temperatures in the range of −40° C. to 200° C., preferably −20° C. to 150° C. In the first step the titanium(IV) compound is reacted with the trialkyl aluminum compound at temperatures in the range of −40° C. to 100° C., preferably −20° C. to 50° C. using a molar ratio of titanium to aluminum in the range of 1:0.1 to 1:0.8. The concentrations of the starting materials are in the range of 0.1 to 9.1 mol/L, preferably 5 to 9.1 mol/L, for the titanium (IV) compound and in the range of 0.05 and 1 mol/L, preferably 0.1 to 0.9 mol/L for the trialkyl aluminum compound. The titanium component is added to the aluminum compound over a period of 0.1 min to 800 min, preferably 30 min to 600 min. In a second step, if applied, the reaction product obtained in the first step is treated with a trialkyl aluminum compound at temperatures in the range of −10° C. to 150° C., preferably 10° C. to 130° C. using a molar ratio of titanium to aluminum in the range of 1:0.01 to 1:5.

In yet another embodiment, a suitable catalyst system is obtained by a procedure wherein, in a first reaction stage, a magnesium alcoholate is reacted with a titanium chloride in an inert hydrocarbon at a temperature of 50° to 100° C. In a second reaction stage the reaction mixture formed is subjected to heat treatment for a period of about 10 to 100 hours at a temperature of 110° to 200° C. accompanied by evolution of alkyl chloride until no further alkyl chloride is evolved, and the solid is then freed from soluble reaction products by washing several times with a hydrocarbon.

In a further embodiment, catalysts supported on silica, such as for example the commercially available catalyst system Sylopol 5917 can also be used.

Using such catalyst systems, the polymerization is normally carried out in suspension at low pressure and temperature in one or multiple steps, continuous or batch. The polymerization temperature is typically in the range of 30° C. to 130° C., preferably is the range of 50° C. and 90° C. and the ethylene partial pressure is typically less than 10 MPa, preferably 0.05 and 5 MPa. Trialkyl aluminums, like for example but not limited to isoprenyl aluminum and triisobutyl aluminum, are used as co-catalyst such that the ratio of Al:Ti (co-catalyst versus catalyst) is in the range of 0.01 to 100:1, more preferably is the range of 0.03 to 50:1. The solvent is an inert organic solvent as typically used for Ziegler type polymerizations. Examples are butane, pentane, hexane, cyclohexene, octane, nonane, decane, their isomers and mixtures thereof. The polymer molecular mass is controlled through feeding hydrogen. The ratio of hydrogen partial pressure to ethylene partial pressure is in the range of 0 to 50, preferably the range of 0 to 10. The polymer is isolated and dried in a fluidized bed drier under nitrogen. The solvent may be removed through steam distillation in case of using high boiling solvents. Salts of long chain fatty acids may be added as a stabilizer. Typical examples are calcium, magnesium and zinc stearate.

Optionally, other catalysts such as Phillips catalysts, metallocenes and post metallocenes may be employed. Generally a cocatalyst such as alumoxane or alkyl aluminum or alkyl magnesium compound is also employed. Other suitable catalyst systems include Group 4 metal complexes of phenolate ether ligands.

In accordance with the present disclosure, the polyethylene polymer is formed into particles and combined with a plasticizer. In order to dramatically and unexpectedly increase dissolution rates into the plasticizer and/or to rapidly form a homogeneous gel-like material, the polyethylene is particularly selected so as to have at least one of two physical characteristics. In one embodiment, for instance, the polyethylene particles are made from a polyethylene polymer having a relatively low bulk density as measured according to DIN53466. For instance, in one embodiment, the bulk density is generally less than about 0.4 g/cm$^3$, such as less than about 0.35 g/cm$^3$, such as less than about 0.33 g/cm$^3$, such as less than about 0.3 g/cm$^3$, such as less than about 0.28 g/cm$^3$, such as less than about 0.26 g/cm$^3$. The bulk density is generally greater than about 0.1 g/cm$^3$, such as greater than about 0.15 g/cm$^3$. In one embodiment, the polymer has a bulk density of from about 0.2 g/cm$^3$ to about 0.27 g/cm$^3$.

Alternatively or in addition to having a relatively low bulk density, the polyethylene particles can have a controlled particle size distribution that has also been found to dramatically improve dissolution times into the plasticizer when heated. In one embodiment, for instance, the polyethylene particles can be a free-flowing powder. In accordance with the present disclosure, the particles can have a median particle size (d50) of less than 125 microns. For example, the median particle size (d50) of the polyethylene particles can be less than about 110 microns, such as less than about 105 microns, such as less than about 100 microns, such as less than about 95 microns. The median particle size (d50) is generally greater than about 60 microns. For instance, the median particle size (d50) can be from about 60 microns to less than 125 microns, such as from about 70 microns to about 110 microns. The powder particle size can be measured utilizing a laser diffraction method according to ISO 13320.

In addition to having a median particle size within the above ranges, the particle size distribution of the polyethylene polymer particles can also be controlled so as to contain relatively little to no larger particles. For instance, in one embodiment, 90% of the polyethylene particles can have a particle size of less than about 180 microns. In other embodiments, 90% of the polyethylene particles can have a particle size of less than about 170 microns, such as less than about 165 microns, such as less than about 160 microns, such as less than about 155 microns, such as less than about 150 microns, such as less than about 145 microns, such as less than about 140 microns, such as less than about 135 microns, such as less than about 130 microns, such as less than about 125 microns, such as less than about 120 microns.

The above physical characteristics have been found to dramatically improve the ability of the polymer particles to blend with the plasticizer and form a homogeneous solution during gel processing. In one embodiment, the polyethylene polymer selected for use in the polymer composition can have a relatively high molecular weight. For instance, the molecular weight can be relatively high in relation to the bulk density of the polymer. Of particular advantage, it was discovered that even relatively high molecular weight polymers can rapidly blend with the plasticizer and have extremely short dissolution times. In some applications, for instance, the use of relatively high molecular weight polymers may be preferred. The use of high molecular weight polymers, for instance, may improve various physical properties of the resulting product, such as the strength characteristics of the resulting product.

The polyethylene polymer, for instance, may have an average molecular weight, as determined according to the Margolies equation. The molecular weight can be determined by first measuring the viscosity number according to DIN EN ISO Test 1628. Dry powder flow is measured using a 25 mm nozzle. The molecular weight is then calculated using the Margolies equation from the viscosity numbers, of at least or greater than about 500,000 g/mol, such as greater than about 1,000,000 g/mol, such as greater than about 1,500,000 g/mol, such as greater than about 2,000,000 g/mol, such as greater than about 2,500,000 g/mol, such as greater than about 3,000,000 g/mol, such as greater than about 3,500,000 g/mol, such as greater than about 4,000,000 g/mol. The average molecular weight is generally less than about 12,000,000 g/mol, such as less than about 10,000,000.

The polyethylene may have a viscosity number of from at least 100 mL/g, such as at least 500 mL/g, such as at least 1,500 mL/g, such as at least 2,000 mL/g, such as at least 4,000 mL/g to less than about 6,000 mL/g, such as less than about 5,000 mL/g, such as less than about 4000 mL/g, such as less than about 3,000 mL/g, such as less than about 1,000 mL/g, as determined according to ISO 1628 part 3 utilizing a concentration in decahydronapthalene of 0.0002 g/mL.

The polyethylene may have a crystallinity of from at least about 40% to 85%, such as from 45% to 80%.

In order to form polymer articles through a gel spinning or extruding process, the polyethylene particles as described above are combined with a plasticizer to form a polymer composition. In general, the polyethylene particles are present in the polymer composition in an amount up to about 50% by weight. For instance, the polyethylene particles can be present in the polymer composition in an amount less than about 45% by weight, such as in an amount less than about 40% by weight, such as in an amount less than about 35% by weight, such as in an amount less than about 30% by weight, such as in an amount less than about 25% by weight, such as in an amount less than about 20% by weight, such as in an amount less than about 15% by weight, such as in an amount less than about 10% by weight, such as in an amount less than about 5% by weight. The polyethylene particles can be present in the composition in an amount greater than about 1% by weight, such as in an amount greater than about 3% by weight, such as in an amount greater than about 5% by weight, such as in an amount greater than about 10% by weight, such as in an amount greater than about 15% by weight, such as in an amount greater than about 20% by weight, such as in an amount greater than about 25% by weight. During gel processing, the plasticizer can be substantially or completely removed in forming polymer articles. For example, in one embodiment, the resulting polymer article can contain the polyethylene polymer in an amount greater than about 70% by weight, such as in an amount greater than about 80% by weight, such as in an amount greater than about 85% by weight, such as in an amount greater than about 90% by weight, such as in an amount greater than about 95% by weight, such as in an amount greater than about 98% by weight, such as in an amount greater than about 99% by weight.

In general, any suitable plasticizer can be combined with the polyethylene particles as long as the plasticizer is capable of forming a gel-like material suitable for gel spinning or extruding. The plasticizer, for instance, may comprise a hydrocarbon oil, an alcohol, an ether, an ester such as a diester, or mixtures thereof. For instance, suitable plasticizers include mineral oil, a paraffinic oil, decaline, and the like. Other plasticizers include xylene, dioctyl phthalate, dibutyl phthalate, stearyl alcohol, oleyl alcohol, decyl alcohol, nonyl alcohol, diphenyl ether, n-decane, n-dodecane, octane, nonane, kerosene, toluene, naphthalene, tetraline, and the like. In one embodiment, the plasticizer may comprise a halogenated hydrocarbon, such as monochlorobenzene. Cycloalkanes and cycloalkenes may also be used, such as camphene, methane, dipentene, methylcyclopentandiene, tricyclodecane, 1,2,4,5-tetramethyl-1,4-cyclohexadiene, and the like. The plasticizer may comprise mixtures and combinations of any of the above as well.

The plasticizer is generally present in the composition used to form the polymer articles in an amount greater than about 50% by weight, such as in an amount greater than about 55% by weight, such as in an amount greater than about 60% by weight, such as in an amount greater than about 65% by weight, such as in an amount greater than about 70% by weight, such as in an amount greater than about 75% by weight, such as in an amount greater than about 80% by weight, such as in an amount greater than about 85% by weight, such as in an amount greater than about 90% by weight, such as in an amount greater than about 95% by weight, such as in an amount greater than about 98% by weight. In fact, the plasticizer can be present in an amount up to about 99.5% by weight.

When the polyethylene particles made in accordance with the present disclosure are combined with a plasticizer, the particles rapidly blend with the plasticizer to form a homogeneous gel-like material. For example, polyethylene particles made according to the present disclosure, when tested according to the solubility test as described in the examples below, can have a solubility of less than about 3 mins., such as less than about 2.5 mins., such as less than about 2 mins., such as even less than about 1.8 mins. The solubility is generally greater than about 0.1 mins.

In order to form polymer articles in accordance with the present disclosure, the polyethylene particles are combined with the plasticizer and extruded through a die of a desired shape. In one embodiment, the composition can be heated within the extruder. For example, the plasticizer can be combined with the polyethylene particles and fed into an extruder. In accordance with the present disclosure, the plasticizer and polyethylene particles form a homogeneous gel-like material prior to leaving the extruder for forming polymer articles with little to no impurities.

In one embodiment, elongated articles are formed during the gel spinning or extruding process. The polymer article, for instance, may be in the form of a fiber, a film, or a membrane.

During the process, at least a portion of the plasticizer is removed from the final product. The plasticizer removal process may occur due to evaporation when a relatively volatile plasticizer is used. Otherwise, an extraction liquid can be used to remove the plasticizer. In one embodiment, evaporation and extraction are both used.

If desired, the resulting polymer article can be stretched at an elevated temperature below the melting point of the polyethylene polymer to increase strength and modulus. Suitable temperatures for stretching are in the range of from about ambient temperature to about 155° C. The draw ratios can generally be greater than about 4, such as greater than about 6, such as greater than about 8, such as greater than about 10, such as greater than about 15, such as greater than about 20, such as greater than about 25, such as greater than about 30. In certain embodiments, the draw ratio can be greater than about 50, such as greater than about 100, such as greater than about 110, such as greater than about 120, such as greater than about 130, such as greater than about 140, such as greater than about 150. Draw ratios are generally less than about 1,000, such as less than about 800, such as less than about 600, such as less than about 400. In one embodiment, lower draw ratios are used such as from about 4 to about 10. The polymer article can be uniaxially stretched or biaxially stretched.

Polymer articles made in accordance with the present disclosure have numerous uses and applications. For example, in one embodiment, the process is used to produce a membrane. The membrane can be used, for instance, as a battery separator. Alternatively, the membrane can be used as a microfilter. When producing fibers, the fibers can be used to produce nonwoven fabrics, ropes, nets, and the like. In one embodiment, the fibers can be used as a filler material in ballistic apparel.

The polymer composition and polymer articles made in accordance with the present disclosure may contain various other additives, such as heat stabilizers, light stabilizers, UV absorbers, flame retardants, lubricants, colorants, acid scavengers, and the like.

In one embodiment, a heat stabilizer may be present in the composition. The heat stabilizer may include, but is not limited to, phosphites, aminic antioxidants, phenolic antioxidants, or any combination thereof.

In one embodiment, an antioxidant may be present in the composition. The antioxidant may include, but is not limited to, secondary aromatic amines, benzofuranones, sterically hindered phenols, or any combination thereof.

In one embodiment, a light stabilizer may be present in the composition. The light stabilizer may include, but is not limited to, 2-(2'-hydroxyphenyl)-benzotriazoles, 2-hydroxy-4-alkoxybenzophenones, nickel containing light stabilizers, 3,5-di-tert-butyl-4-hydroxbenzoates, sterically hindered amines (HALS), or any combination thereof.

In one embodiment, a UV absorber may be present in the composition in lieu of or in addition to the light stabilizer. The UV absorber may include, but is not limited to, a benzotriazole, a benzoate, or a combination thereof, or any combination thereof.

In one embodiment, a halogenated flame retardant may be present in the composition. The halogenated flame retardant may include, but is not limited to, tetrabromobisphenol A (TBBA), tetrabromophthalic acid anhydride, dedecachloropentacyclooctadecadiene (dechlorane), hexabromocyclodedecane, chlorinated paraffins, or any combination thereof.

In one embodiment, a non-halogenated flame retardant may be present in the composition. The non-halogenated flame retardant may include, but is not limited to, resorcinol diphosphoric acid tetraphenyl ester (RDP), ammonium polyphosphate (APP), phosphine acid derivatives, friaryl phosphates, trichloropropylphosphate (TCPP), magnesium hydroxide, aluminum trihydroxide, antimony trioxide.

In one embodiment, a lubricant may be present in the composition. The lubricant may include, but is not limited to, silicone oil, waxes, molybdenum disulfide, or any combination thereof.

In one embodiment, a colorant may be present in the composition. The colorant may include, but is not limited to, inorganic and organic based color pigments.

In one embodiment, an acid scavenger may be present in the composition. One example of an acid scavenger, for instance, is calcium stearate.

These additives may be used singly or in any combination thereof. In general, unless stated otherwise, if the additives are utilized, they may be present in an amount of at least about 0.05 wt. %, such as at last about 0.1 wt. %, such as at least about 0.25 wt. %, such as at least about 0.5 wt. %, such as at least about 1 wt. % and generally less than about 20 wt. %, such as less than about 10 wt. %, such as less than about 5 wt. %, such as less than about 4 wt. %, such as less than about 2 wt. %. The sum of the wt. % of all of the components, including any additives if present, utilized in the polymer composition will be 100 wt. %.

The present disclosure may be better understood with reference to the following examples. The following examples are given below by way of illustration and not by way of limitation. The following experiments were conducted in order to show some of the benefits and advantages of the present invention.

EXAMPLE 1

Three grades of high density polyethylene were selected with similar molecular weights (4-4.5 million g/mol) and different bulk densities. The samples were sieved such that a middle fraction was received of 100-125 micrometers grain size. Accordingly, comparative values of molecular weight and grain size were obtained with differing values of bulk density. Bulk densities were determined by International Standard ISO 60.

Solubility testing was performed to determine dissolving time in mineral oil.

Solubility Test

The following solubility test was used to determine dissolving time for the different samples. The polymer particles were combined with the oil under defined conditions and while monitoring the torque put on the screw.

When the resin dissolves in the oil, the polymer chains increase the viscosity of the fluid (same principle as VN-testing) leading to an increase in torque. When all resin is dissolved in the oil, the torque reaches an equilibrium level. The time that is needed to reach equilibrium torque is a measure for the dissolving time of the resin.

Equipment Used: Haake RheoStress 600 equipped with screw-like stirrer.

Sample Preparation:
1. Weight 80 g of process oil, 450 mg of Irganox B215 and 225 mg of resin powder into measurement bowl.
2. Install bowl to Rheostress and start measurement program.

Test Program:
1. Heat bowl to 180° C.
2. Once temperature is reached, set screw rpm to 130 rpm.
3. Keep stirring for 150 min while recording torque reading.

Data Evaluation:
1. Identify region where torque (viscosity) is constant.
2. Generate linear fit (horizontal line) in this region (typically: 140-160 minutes).
3. Calculate confidence interval for the fit line.
4. Identify first data point within the confidence interval to determine dissolving time.
5. For end viscosity, determine average viscosity in linear fit region.

Viscosity testing of the four samples are illustrated in FIG. 1. Dissolution times are shown in the following table.

TABLE 1

| Property | Sample No. 1 | Sample No. 2 | Sample No. 3 |
|---|---|---|---|
| Average molecular-weight (million g/mol) | 4.7 | 4.0 | 4.6 |
| Grain size (μm) | 100-125 | 100-125 | 100-125 |
| Bulk density (g/cm$^3$) | 0.45 | 0.25 | 0.25 |
| Dissolving time (min) | 11.6 | 4.0 | 3.2 |

As shown above, the lower bulk density samples unexpectedly and dramatically reduced the dissolving time.

EXAMPLE 2

The following example was performed in order to demonstrate that particle size distribution can have a dramatic effect on dissolving time.

Two different samples of high density polyethylene powders were selected. Sample No. 1 had an average particle size (d50) of 98 microns, while Sample No. 2 had an average particle size (d50) of 135 microns. Except for the particle size distribution, the polyethylene polymers used in the samples were relatively the same.

The different samples were subjected to the solubility test as described above. In addition, the polyethylene particles were gel extruded and the resulting polymer articles were tested for various properties. The following results were obtained:

TABLE 2

| Property | Unit | Test Method | Sample No. 1 | Sample No. 2 |
|---|---|---|---|---|
| Average molecular weight | g/mol | Calculated from VN using Margolies' equation | $1.6 * 10^6$ | $1.7 * 10^6$ |
| Viscosity number | ml/g | ISO 1628, part 3 | 1040 | 1100 |
| Intrinsic viscosity | ml/g | ISO 1628, part 3 | 977 | 1000 |
| Bulk density | g/cm$^3$ | ISO 60 | 0.46 | 0.45 |
| Average particle size (d50) | µm | Laser scattering | 98 | 135.0 |
| Average particle size (d90) | µm | Laser scattering | 158 | 200 |
| Dissolving Time | mins. | | <2 mins. | 4 mins. |

As shown above, the different particle size distribution of Sample No. 1 reduced the dissolving time by more than 50% in relation to Sample No. 2.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. The polymer composition for producing gel extruded articles comprising:
   a plasticizer; and
   high density polyethylene particles that when combined with the plasticizer form a gel-like material, the high density polyethylene particles having a bulk density of less than about 0.33 g/cm$^3$ and a median particle size (d50) of less than 125 microns, and wherein the high density polyethylene has an average molecular weight of greater than about 1,500,000 g/mol; and wherein 90% of the high density polyethylene particles have a particle size of less than about 180 microns; and wherein the high density polyethylene is a Ziegler-Natta catalyzed ultrahigh molecular weight polyethylene.

2. The polymer composition as defined in claim 1, wherein the high density polyethylene particles have a bulk density of less than about about 0.28 g/cm$^3$.

3. The polymer composition as defined in claim 1, wherein the high density polyethylene particles have a median particle size (d50) of less than about 100 microns.

4. The polymer composition as defined in claim 1, wherein the high density polyethylene particles have a median particle size (d50) of from about 60 microns to less than 110 microns.

5. The polymer composition as defined in claim 1, wherein, when tested according to a solubility test, the high density polyethylene particles have a solubility of less than about 3 mins.

6. The polymer composition as defined in claim 1, wherein the high density polyethylene particles are present in the composition in an amount up to about 50% by weight.

7. The polymer composition as defined in claim 1, wherein the plasticizer comprises mineral oil, a paraffinic oil, a hydrocarbon, an alcohol, an ether, an ester, or mixtures thereof.

8. The polymer composition as defined in claim 1, wherein the high density polyethylene has a molecular weight of greater than about 2,000,000 g/mol.

9. The polymer composition as defined in claim 1, wherein the plasticizer comprises decaline, xylene, dioctyl phthalate, dibutyl phthalate, stearyl alcohol, oleyl alcohol, decyl alcohol, nonyl alcohol, diphenyl ether, n-decane, n-dodecane, octane, nonane, kerosene, toluene, naphthalene, tetraline, monochlorobenzene, camphene, methane, dipentene, methylcyclopentandiene, tricyclodecane, 1,2,4,5-tetramethyl-1,4-cyclohexadiene, or mixtures thereof.

10. A process for producing polymer articles comprising:
    forming the polymer composition as defined in claim 1 into a gel-like composition;
    extruding the gel-like composition through a die to form a polymer article, the polymer article comprising fibers, a film, or a membrane.

11. The process as defined in claim 10, further comprising the step of removing at least part of the plasticizer from the polymer article.

12. A polymer article comprising a fiber, a film, or a membrane, the polymer article being produced by:
    combining a plasticizer with high density polyethylene particles to form a gel-like composition, the high density polyethylene particles having bulk density of less than about 0.33 g/cm$^3$ and a median particle size (d50) of less than 125 microns and wherein 90% of the particles have a particle size of less than about 180 microns, and wherein the high density polyethylene has an average molecular weight of greater than about 1,500,000 g/mol; and wherein the high density polyethylene is a Ziegler-Natta catalyzed ultrahigh molecular weight polyethylene; and
    extruding the gel-like composition through a die to form the polymer article.

13. The polymer article as defined in claim 12, wherein the high density polyethylene particles have a bulk density of less than about 0.28 g/cm$^3$.

14. The polymer article as defined in claim 12, wherein the high density polyethylene particles have a median particle size (d50) of from about 60 microns to less than 110 microns.

15. The polymer article as defined in claim 12, wherein the polymer article comprises a membrane.

16. The polymer article as defined in claim 12, wherein the polymer article comprises fibers.

* * * * *